(12) United States Patent
Brezee et al.

(10) Patent No.: US 8,948,803 B2
(45) Date of Patent: Feb. 3, 2015

(54) METHOD TO OPTIMIZE THE SELECTION AND DELIVERY OF A SHOULDER-TAP TO A CELLULAR MOBILE STATION

(75) Inventors: Kirk E. Brezee, Richmond, CA (US); Byung Hoon Sim, San Jose, CA (US); Dae Seong Kim, Campbell, CA (US); Syed Z. Hosain, San Jose, CA (US); Lotus Weygandt, Los Gatos, CA (US); Saraswathi Balasubramaniam, Palo Alto, CA (US); Michael Garner, Richardson, TX (US)

(73) Assignee: Aeris Communications, Inc., Santa Clara, CA (US)

( * ) Notice: Subject to any disclaimer, the term of this patent is extended or adjusted under 35 U.S.C. 154(b) by 442 days.

(21) Appl. No.: 13/402,392

(22) Filed: Feb. 22, 2012

(65) Prior Publication Data

US 2013/0217431 A1 Aug. 22, 2013

(51) Int. Cl.
*H04B 7/00* (2006.01)
(52) U.S. Cl.
USPC ........... 455/517; 455/500; 455/503; 455/522; 340/12.5
(58) Field of Classification Search
CPC .................................................... H04W 12/00

USPC ................ 455/517, 500, 503, 522; 340/12.5; 705/1, 26
See application file for complete search history.

(56) References Cited

U.S. PATENT DOCUMENTS

| | | | |
|---|---|---|---|
| 2003/0187920 A1* | 10/2003 | Redkar | 709/203 |
| 2005/0136898 A1 | 6/2005 | Shaheen et al. | |
| 2005/0216301 A1* | 9/2005 | Brown | 705/1 |
| 2007/0019610 A1 | 1/2007 | Backholm et al. | |
| 2011/0021195 A1 | 1/2011 | Cormier et al. | |
| 2014/0167928 A1* | 6/2014 | Burd et al. | 340/12.5 |

OTHER PUBLICATIONS

The International Search Report and the Written Opinion of the International Searching Authority for International Application No. PCT/US2013/027027, mailed Apr. 15, 2014.

* cited by examiner

*Primary Examiner* — Sanh Phu
(74) *Attorney, Agent, or Firm* — Sawyer Law Group, P.C.

(57) ABSTRACT

To select a shoulder-tap method or a set of methods that optimizes the delivery of a shoulder-tap with respect to feasibility, reliability, and cost, in accordance with the present invention. Each shoulder-tap method can be evaluated on its feasibility, reliability and cost. A shoulder-tap method can be selected and used that optimizes reliability and cost with respect to feasibility constraints.

20 Claims, 8 Drawing Sheets

METHOD TO OPTIMIZE THE SELECTION AND DELIVERY OF A SHOULDER-TAP TO A CELLULAR MOBILE STATION

FIELD OF THE INVENTION

The present invention relates generally to cellular mobile stations and more particularly to a method for the optimization of the delivery of a shoulder-tap to a cellular mobile station.

BACKGROUND

It is generally known that a mechanism is needed to establish, actively maintain, or manage a valid network connection between two devices. Often it is desirable for remote devices, such as wireless phones and other wireless devices ("remote devices"), to initiate or be initiated to effect an active data session with a central station, server or other uplink means. However, when connecting remote devices to a cellular station or network, communicating an appropriate message that can be received, understood and acted upon by the station may result in unreliable or unpredictable service as often the requirements of the application and the available internet protocol (IP) addressing schemes available by the wireless telecommunications provider in relation to the remote device (s) are not well understood. More specifically, in wireless systems, aside from determining which side of the connection (e.g., device or mobile station) initiates the communication, the ability to effectively and reliably communicate during initiation poses challenges. As wireless carriers handle usage and management of IP addresses differently, obstacles may arise in the ability to effectively link and communicate in view of the type of IP connectivity options available for a targeted application.

One approach provides for using an 'active' packet on a device to prevent the disconnection of that device from a network following a period of time where the device is determined to have failed to communicate with network. Such an active packet approach could be suited for a general packet radio services (GPRS) network in which the device would be disconnected after a sustained or predetermined period of time. Alternatively, another approach may involve heavy polling with or of communication devices intended for communication. Other approaches may include sending a short message service (SMS) message to a device, following a long period since the device's prior transmission to the link, to request the device initiate a connection (often referred to as "shoulder-tap"). Still other approaches may include awakening a device using a shoulder-tap, such as voice wake up, where the device responds to a voice call by establishing a data session such as with a server or by SMS wake up by passing a specific instruction in the body of the SMS to direct the device to act accordingly. Utilizing shoulder-tap and active packet approaches, collectively herein referred to as shoulder-tapping without limitation, provides a means for messaging wireless assets, such as cellular phone devices for instance. While each of these approaches assists to establish an initiating connection, none of these approaches is necessarily an optimal approach to engage for establishing or delivering an initial link as between the device and the mobile station (MS), for instance.

However, the feasibility, reliability and economics associated with various shoulder-tap mechanisms in view of the type of IP connectivity associated with a targeted application for specific communications situations may not be optimally suited to one or any of the above approaches.

Accordingly, what is desired is provide a method to optimize the selection and delivery of a shoulder-tap approach in specific situations, and particularly those of delivery to cellular mobile stations (MS) to improve the feasibility, reliability and economics of establishing communications as well as prioritizing approaches for one or more preferred implementations.

As used herein the terms device, third party system, smart phone, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention includes a method for selecting an optimized delivery of a shoulder-tap to a cellular mobile station (MS) with respect to situational characteristics of the MS and in relation to one or more of feasibility, reliability, and cost of the delivery is provided in accordance with the present invention.

Another embodiment of the present invention includes a method for selecting and delivering in a prioritized sequence a preferential set of two or more shoulder-taps to a cellular mobile station (MS) with respect to situational characteristics of the MS and in relation to one or more of feasibility, reliability, and cost of the delivery is provided in accordance with the present invention.

A further embodiment of the present invention includes provides for a method for selecting and delivering one or more shoulder-tap approaches for delivery to a mobile cellular station in a prioritized manner comprising the steps of: determining a cellular mobile station profile having cellular mobile station characteristics; determining shoulder-tap characteristics of at least two shoulder-tap approaches; comparing the at least two cellular mobile station characteristics of the cellular mobile profile and the shoulder-tap characteristics of each of the at least two shoulder-tap approaches in relation to a predetermined preference profile having a hierarchy of prioritized preferences; selecting shoulder-tap approaches in relation to the step of comparing for feasibility; and, delivering in relation to the prioritized preferences at least one of the selected shoulder-tap approaches to the cellular mobile station.

A further embodiment of the present invention includes a computer program product system having one or more methods for optimally selecting for delivery at least one shoulder-tap to a cellular mobile station (MS) with respect to situational characteristics of the MS including one or more of feasibility, reliability, and cost, is provided in accordance with the present invention.

Each shoulder-tap approach (also used herein generally as "shoulder tap") of the present invention, including those explicitly identified as well as equivalents thereto and other technological developments hereafter associated therewith, has specific characteristics associated with it. These characteristics include an IP State Status, a Character Data Content value, a Data Alphabet value, a Numeric Data Range value, a Relative Reliability value, Relative Cost value, and Radio Access Technology value (collectively "ST Characteristics").

The ST Characteristics are referentially available in association with a shoulder-tap approach. It will be appreciated by those skilled in the art that the ST Characteristics may be available to the present invention in a variety of form including but not limited to being pre-populated in a look-up table, reside in memory, be available for call-out from linked or linkable sources, hard-coded, etc. In the present invention, the ST Characteristics are evaluated in relation to a profile of the MS which is typically the third party system for which a shoulder-tap operation is permitted. The profile of the MS includes information of the MS that can be used by the present invention for association with a select subset of one or more of the ST Characteristics by a means of the present invention to determine the optimal selection and delivery of a shoulder-tap approach for one or more embodiments of the present invention.

Further embodiments, forms, objects, features, advantages, aspects, and benefits of the present application shall become apparent from the detailed description and drawings included herein.

DETAILED DESCRIPTION OF PREFERRED EMBODIMENTS

The present invention relates generally to a cellular mobile station (MS) and more specifically to optimize the selection and delivery of a shoulder-tap to a cellular mobile station (MS). The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides for a method to optimize the selection and delivery of a shoulder-tap approach in specific situations, and particularly those of delivery to cellular mobile stations (MS) to improve the feasibility, reliability and economics of establishing communications as well as prioritizing shoulder-tap approaches for one or more preferred implementations. It will be understood by those skilled in the art that one or more shoulder-tap methods may be employed by the present invention and that the presence or absence of a shoulder-tap method presented herein is not indicative of any limitation to the present invention.

Exemplary Shoulder-Tap Methods of the Present Invention in One or More Embodiments 1. User Datagram Protocol (UDP)

Figure 1:
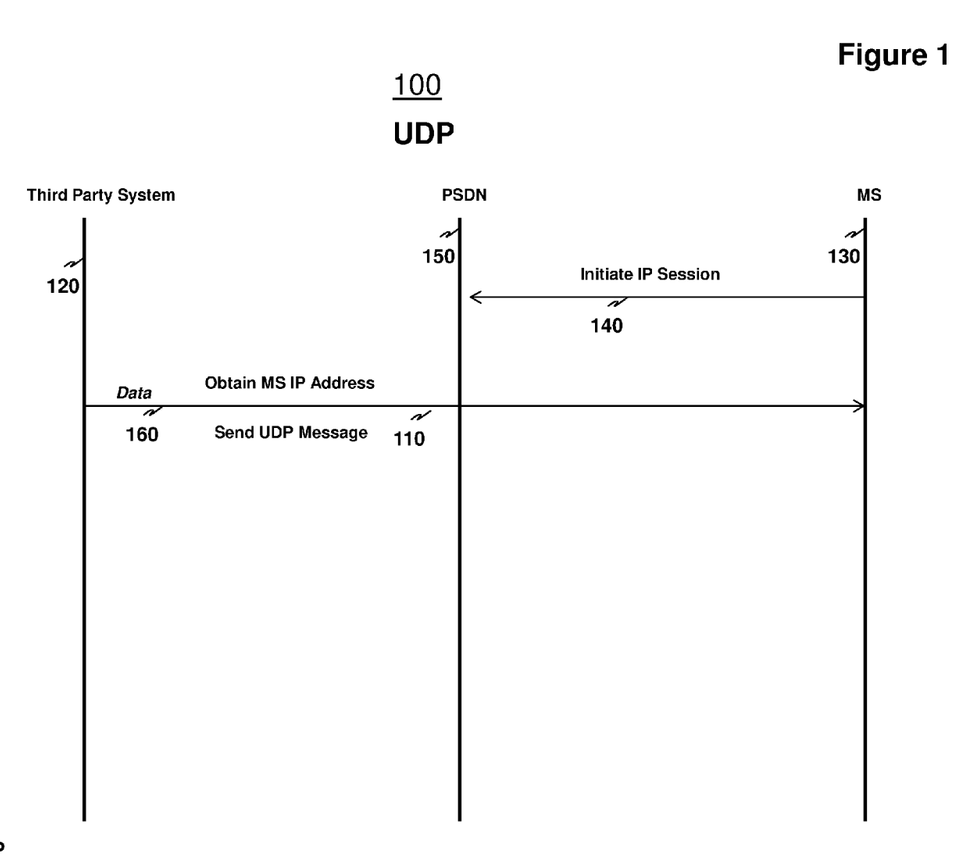
FIG. 1 illustrates communications for a user datagram protocol (UDP) message from a device delivered to an MS using the same IP address that the MS is using for its active session.

FIG. 1 illustrates communications (100) for a user datagram protocol (UDP) message (110) from a device (120) delivered to an MS (130) using the same IP address that the MS is using for its active session. In FIG. 1, the third party system (120) sends a UDP message (110) to an MS (130) following the initiation of the IP session (140) from the MS (130) to the PDSN (150). The UDP message (110) sent has the same IP address that the cellular MS is using for its active internet protocol (IP) session (150). The data content (160) of the UDP message is used by the MS to direct its actions. The third party system (120) sets the content of the data portion (160) of the UDP message. The data portion of the UDP message may then be associated with one or more of the ST Characteristics, as further set forth in Table 1, by example.

For the present invention, the data portion (160) is received and processes the UDP messages at the MS. In one or more embodiments of the present invention, the method is in the form of a software product operational with the MS (130) and in communication with the third party device (120).

2. Message Waiting Indicator (MWI)

Figure 2:
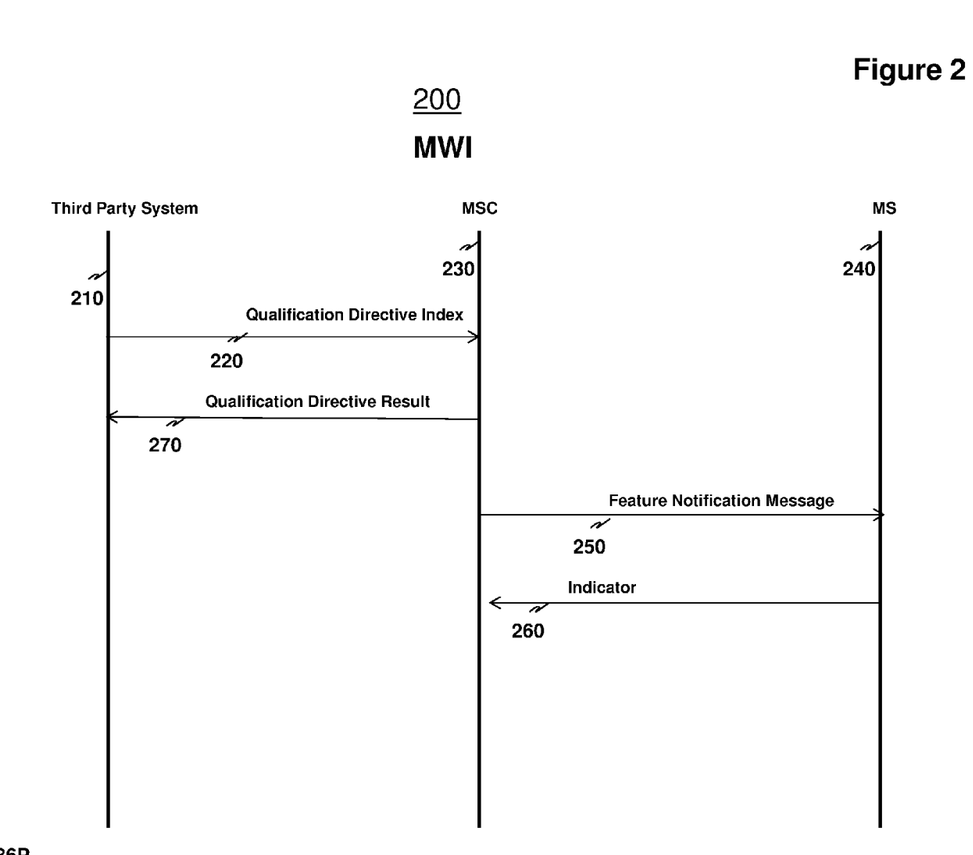
FIG. 2 illustrates communications for a Message Waiting Indicator (MWI) from a third party system sending a ANSI-41 Qualification Directive message (QUALDIR) message to a serving MSC for an MS registered at that MSC.

FIG. 2 illustrates communications (200) for a Message Waiting Indicator (MWI) from a third party system (210) sending a ANSI-41 Qualification Directive message (QUALDIR) message (220) to a serving MSC (230) for an MS (240) registered at that MSC (230). In FIG. 2, the MSC (230), using code division multiple access (CDMA) air interface messages, after receiving the QUALDIR (220), delivers the appropriate information (250) to the MS (240). In that delivered information, RecordType and MessageCount may be included (250), by way of example. When the MS (240) receives the appropriate information from the MSC (230), the MS (240) performs the requested action as directed at 240, returns an indication (260) to the MSC (230), which in turn delivers a Qualification Directive Return result (QUALDR) at 270. The third party system (210) sets the values of the MessageWaitingNotificationCount and the MessageWaitingNotificationType parameters and sub-parameters of the QUALDIR message by example. The data portion of the MWI may then be associated with one or more of the ST Characteristics, as further set forth in Table 1, by example. In one or more embodiments of the present invention, the method is in the form of a software product operational with the MS (230), capable of receiving and processing the QUALDIR messages, and in communication with the third party device (210).

3. Mobile Terminated Short Message Service (MT-SMS)

Figure 3:
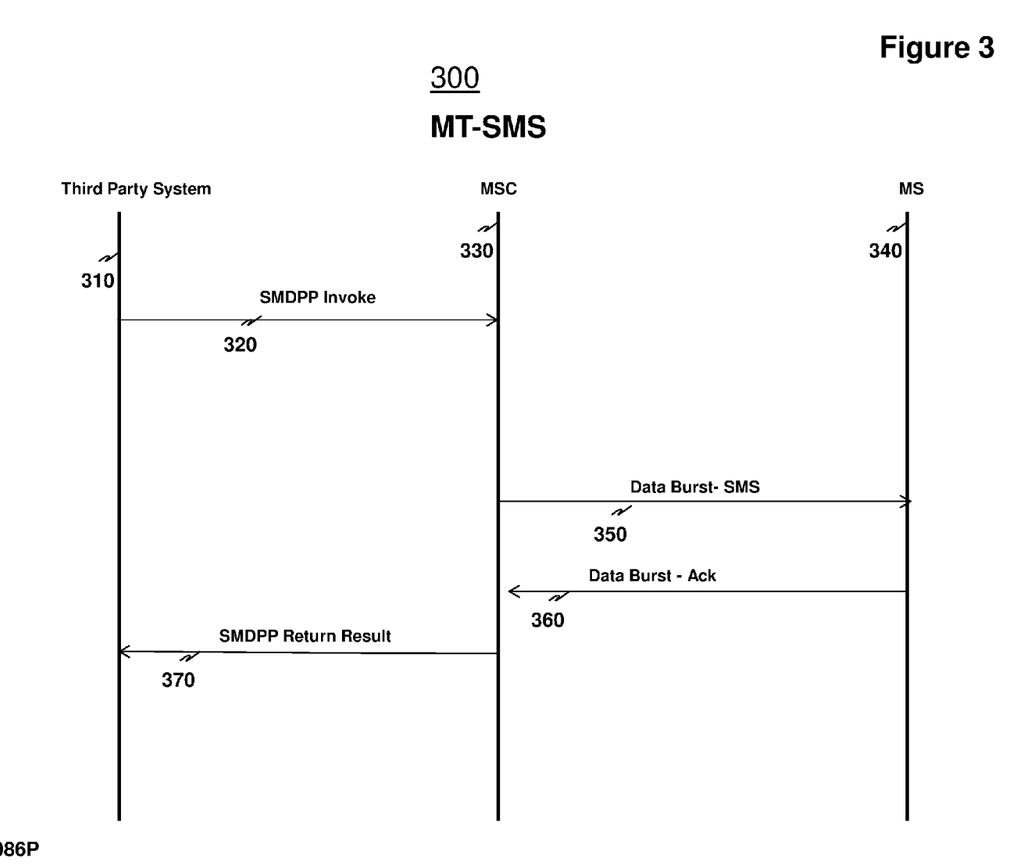
FIG. 3 illustrates communications from a third party system sending an SMDPP message to a serving mobile switching center (MSC) for an MS registered at that MSC.

FIG. 3 illustrates communications (300) from a third party system (310) sending an SMDPP message (320) to a serving mobile switching center (MSC) (330) for an MS (340) registered at that MSC (330). In FIG. 3 the third party system (310)

sends the SMDPP message (320) to the serving MSC (330) for the MS (340) registered at that MSC (330). The MSC (330), using CDMA air interface messages, delivers the appropriate information (350) to the MS (340). The delivered information may include Data Burst, by example (350). When the MS (340) receives the appropriate information (350) from the MSC (330), it performs the requested action at 340. The MSC (340) then typically returns an acknowledgement message (360) to the MSC (330) which in turn responds to the third party system (310) with a Short Message delivery Point to Point Return Result (370). The third party system (310) sets the content of the SMS_BearerData and related fields (320) of the SMDPP message. The data portion of the SMDPP message may then be associated with one or more of the ST Characteristics, as further set forth in Table 1, by example. In one or more embodiments of the present invention, the method is in the form of a software product operational with the MS (340), capable of receiving and processing the SMDPP messages, and in communication with the third party device (310).

4. Calling Number Identification Presentation (CNIP)

Figure 4:
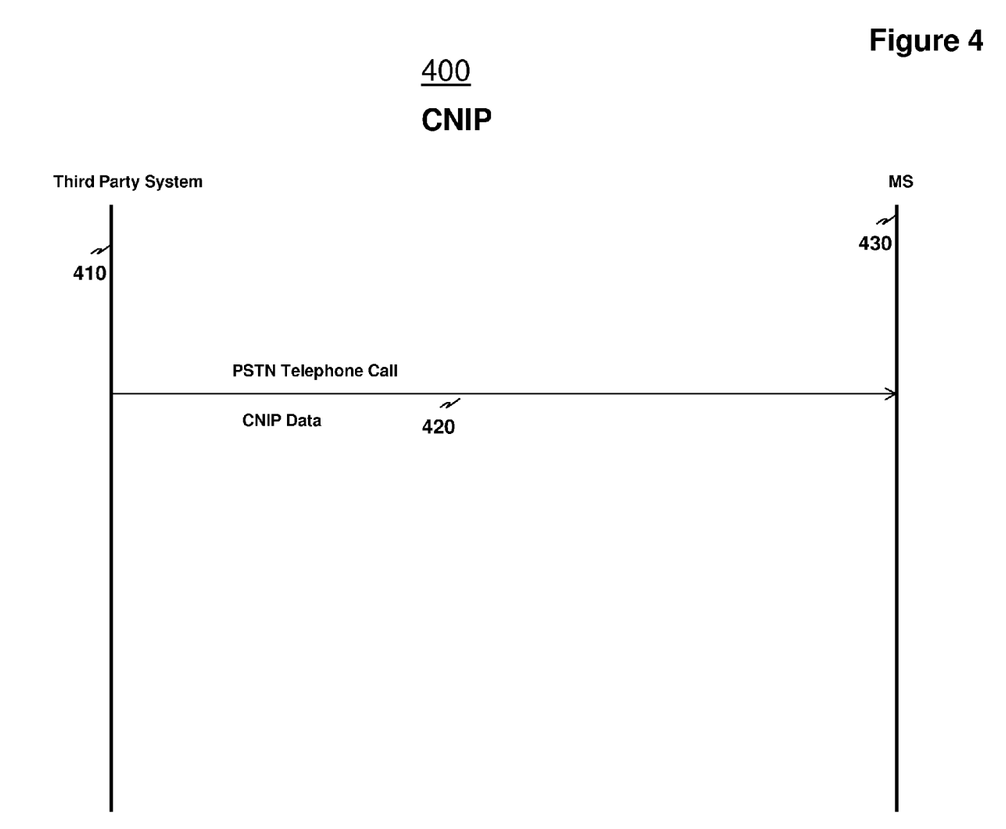
FIG. 4 illustrates communications for Calling Number Identification Presentation (CNIP) from a third party system sending a telephone call to the MS (430) using the Public Switched Telephone Network (PSTN).

FIG. 4 illustrates communications (400) for Calling Number Identification Presentation (CNIP) from a third party system (410) sending a telephone call (420) to the MS (430) using the Public Switched Telephone Network (PSTN). In FIG. 4 the third party system (410) places a telephone call (420) to the MS (430) using the PSTN. The third party system (410) sets the CNIP parameter (420) when placing the call. When the MS (430) receives the telephone call and the CNIP value (420), it performs the requested action at 430. The data portion of the CNIP may then be associated with one or more of the ST Characteristics, as further set forth in Table 1, by example. In one or more embodiments of the present invention, the method is in the form of a software product operational with the MS (430), capable of receiving and processing the CNIP messages, and in communication with the third party device (410).

5. Phone Call

Figure 5:
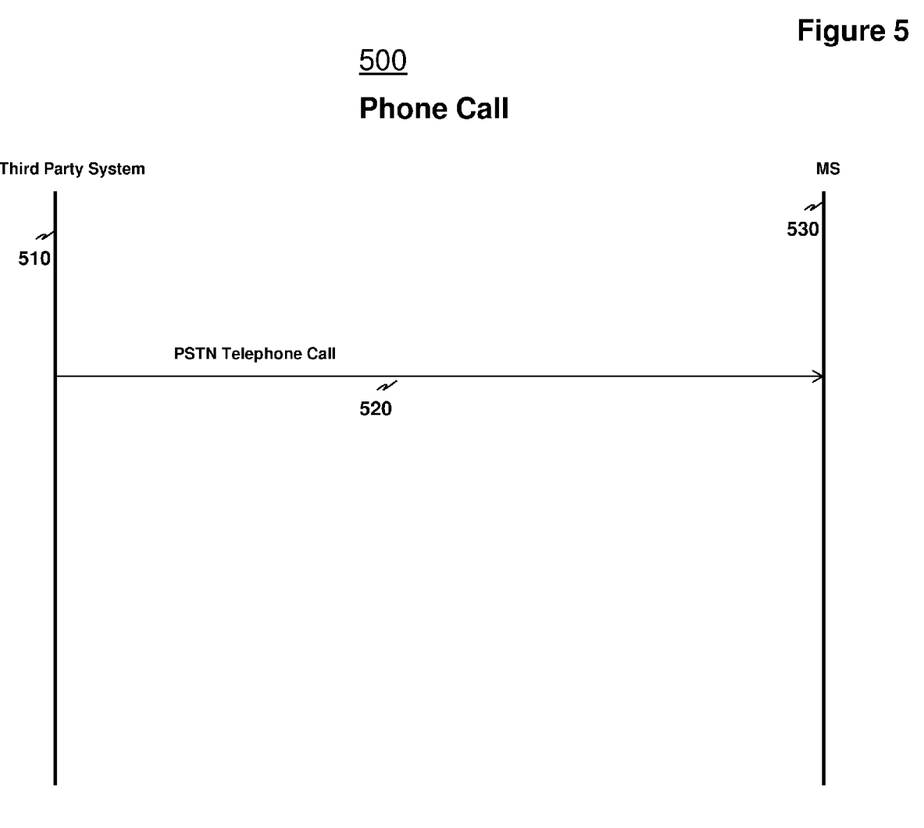
FIG. 5 illustrates communications from a third party system placing a telephone call to the MS using the PSTN.

FIG. 5 illustrates communications (500) from a third party system (510) placing a telephone call (520) to the MS (530) using the PSTN. In FIG. 5 the third party system (510) placing the telephone call (520) to the MS (530) uses the PSTN. When the (530) receives the telephone call (520), it performs the requested action at 530. No data other than the delivery of the phone call is typically delivered to the MS under this approach. The data portion of the Phone Call may then be associated with one or more of the ST Characteristics, as further set forth in Table 1, by example. In one or more embodiments of the present invention, the method is in the form of a software product operational with the MS (530), capable of receiving and processing the Phone Call, and in communication with the third party device (510).

6. SIP IM

Figure 6:
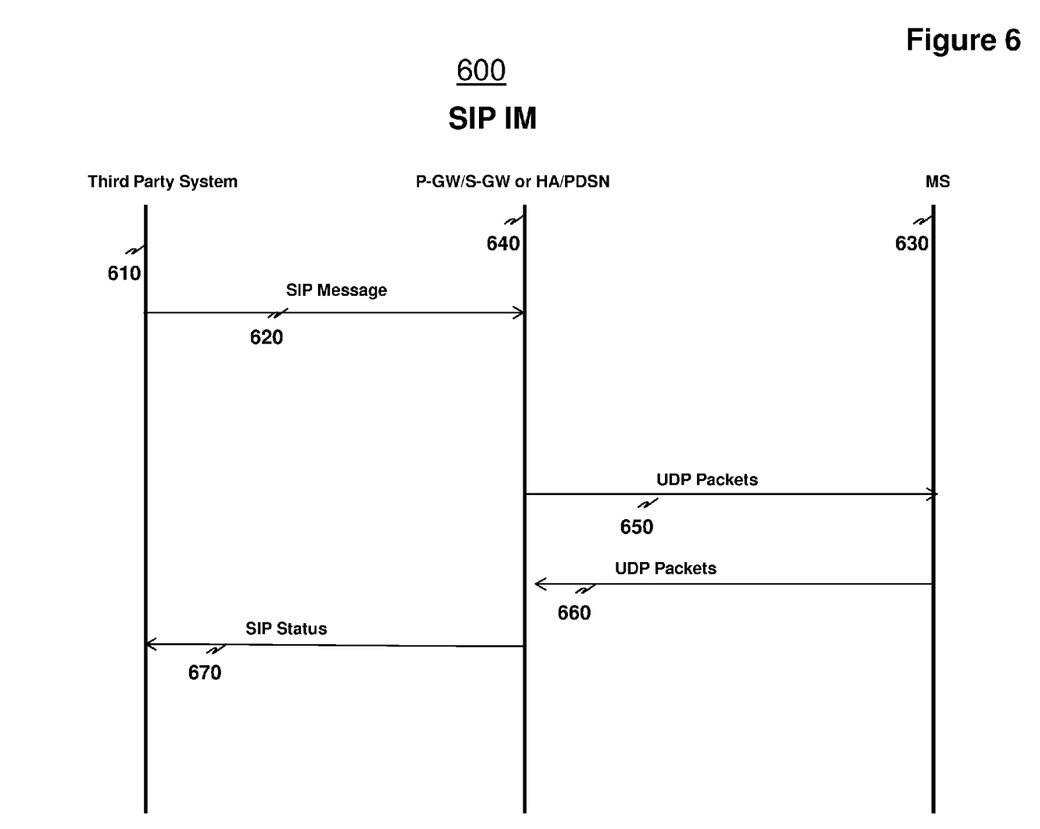
FIG. 6 illustrates communications from a third party system sending a Session Initiation Protocol (SIP) Message to the MS registered at the third party IMS or SIP server using the same IP address that the cellular MS is using for its active IP session.

FIG. 6 illustrates communications (600) from a third party system (610) sending a Session Initiation Protocol (SIP) Message (620) to the MS (630) registered at the third party IMS or SIP (640) server using the same IP address via 650 that the cellular MS (630) is using for its active IP session. When the MS (630) receives the SIP Message (650) at 630, it acknowledges the receipt of the message (660) via a SIP Status message (670) and performs the requested action at 630. The third party system (610) sets the content of the SIP message body (620) and related fields of the SIP message header. The data portion of the SIP MessageI may then be associated with one or more of the ST Characteristics, as further set forth in Table 1, by example. In one or more embodiments of the present invention, the method is in the form of a software product operational with the MS (630), capable of receiving and processing the SIP Message, and in communication with the third party device (610).

7. SNMP

Figure 7:
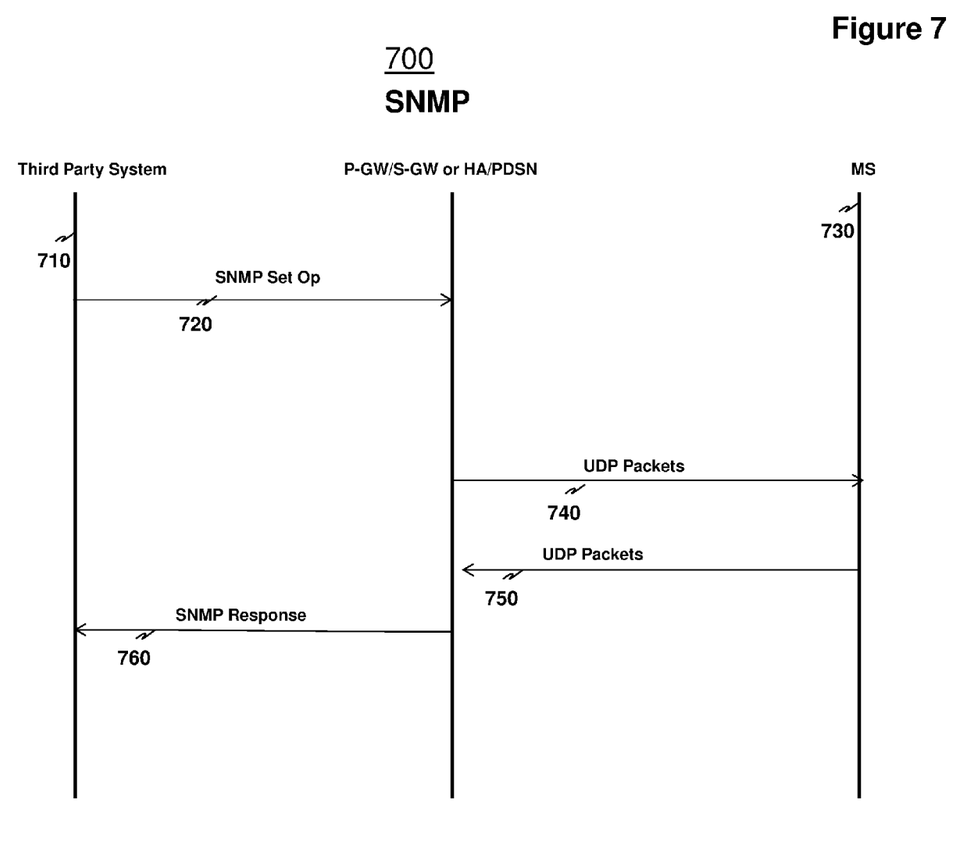
FIG. 7 illustrates communications from a third party system sending a Simple Network Management Protocol (SNMP) Set request message to the MS (730) using the same IP address that the cellular MS is using for its active IP session.

FIG. 7 illustrates communications (700) from a third party system (710) sending a Simple Network Management Protocol (SNMP) Set request message (720) to the MS (730) using the same IP address that the cellular MS (730) is using for its active IP session. When the MS (730) receives the SNMP Set request message (720) via the UDP Packets (740), it acknowledges the receipt of the Set operation with a response message (750) via the SNMP message (760) and performs the requested action at 730. The third party system (710) sets the content of the SNMP Set request message body (720). The data portion of the SNMP Message may then be associated with one or more of the ST Characteristics, as further set forth in Table 1, by example. In one or more embodiments of the present invention, the method is in the form of a software product operational with the MS (730), capable of receiving and processing the SNMP Message, developed specifically to detect and process the change in the Message Information Base (MIB) made by the SNMP Set operation and in communication with the third party device (710).

Preferred Embodiments of the Present Invention

Figure 8:
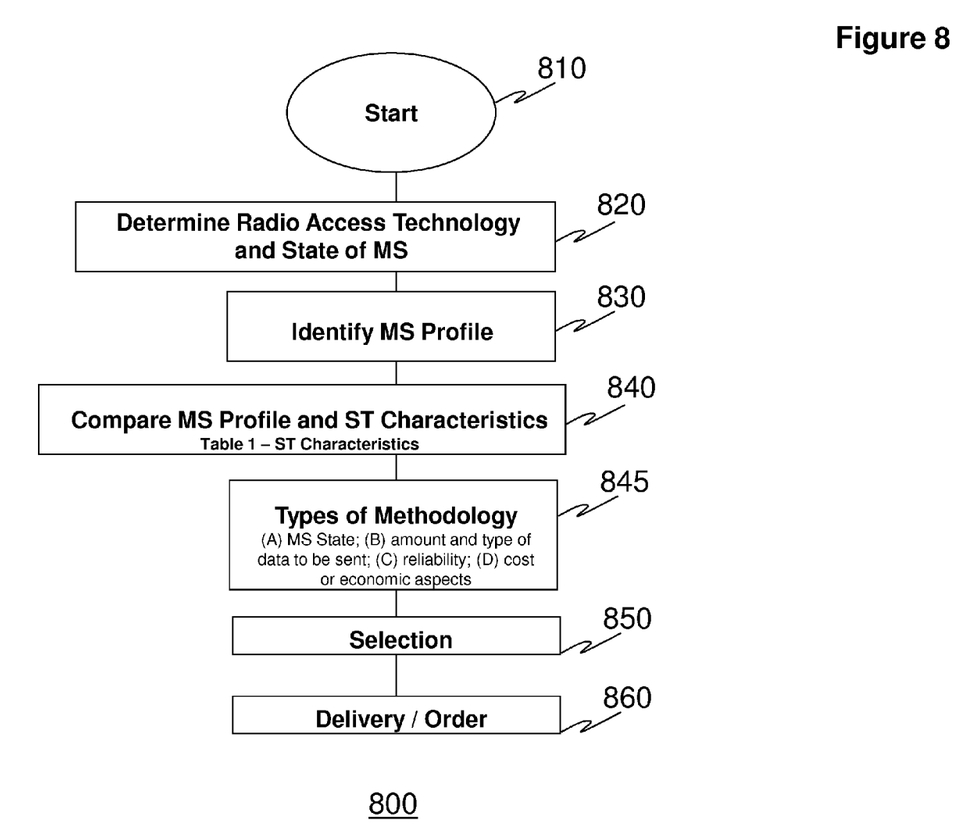
FIG. 8 illustrates a logic diagram for a preferred embodiment of the present invention.

FIG. 8 illustrates a logic diagram for a preferred embodiment of the present invention, where the method of the present invention is operational with a MS, is capable of receiving and processing at least one message associated with one or more shoulder-tap approaches, and is capable of communication with a remote device determining content of a message sent to the MS. In FIG. 8, beginning at 810, the radio access technology and state of the MS (MS State) is determined at 820. From the determination at 820, one or more MS characteristics associated with the intended MS recipient are identified as the MS profile at 830. The identified MS characteristics constitute a MS profile for the MS and the profile is then comparatively assessed in a predetermined manner against relationally associated characteristics of possible shoulder-tap methods (previously set forth as ST characteristics), such as those set forth in Table 1, at 840. It will be appreciated by those skilled in the art that the manner in which the comparative assessment is made at 840 may be set forth in a variety of comparative methodologies. At 845, examples of possible comparative methodologies in one or more preferred embodiments are set forth and include, as one or in any combination by: (A) MS State; (B) amount and type of data to be sent; (C) reliability; (D) cost or economic aspects.

In a preferred embodiment, at 848, comparing the cellular mobile station characteristics of the cellular mobile profile and the one or more shoulder-tap characteristics occurs in relation to a predetermined preference profile. The predetermined preference profile is comprised of a hierarchy of ordered preferences. The ordered preferences may indicate, by example, that the comparative trait of Relative Cost is a top priority, followed by a lesser priority of Relative Reliability, etc. The ordered preferences may be fixed or interactive in determination, and are optional for the present invention.

Table 1 below sets forth an exemplary ST Characteristic association for the present invention.

TABLE 1

| | IP State | Number of characters of data | Data Alphabet | Numeric Data Range | Relative Reliability | Relative Cost |
|---|---|---|---|---|---|---|
| UDP | In IP session | 0-at least 32767 | All byte values (0x00-0xff) | n/a | High | Medium |
| MWI | Not in IP session | 1-3 | decimal digits | 0-255 | Medium | Low |
| MT-SMS | Not in IP session | 0-at least 140 | printable characters | n/a | High | High |
| CNIP | Not in IP session | 0-at least 15 | decimal digits | n/a | Low | Low |
| Phone Call | Not in IP session | 0 | n/a | n/a | Low | Low |
| SIP Message | In IP session | 0-no more than 1300 | Printable characters | n/a | High | Medium |
| SNMP | In IP session | 0-at least 484 | All byte values (0x00-0xff) | n/a | High | Medium |

For instance, one ST characteristics is that of "IP State" being whether the IP session of a message is "in session" or "not in session." For a UDP shoulder-tap message, the IP State would be "in session." A relational MS characteristic associated with the ST Characteristic of IP Session would be that of MS State, wherein the MS would be "in session" or "not in session" with respect to its IP State. Therefore, under the present invention, for any given shoulder-tap approach where its IP State is determined and the associated MS profile was also determined, a relation could be established as to whether the two characteristics were compatible in view of reliability, for instance.

In a preferred embodiment, the methodology used at 845 to determine an optimum shoulder-tap method in relation to the MS profile may include one or more of the following assessment factors: 1. IP state; 2. Number of characters of data; 3. Data alphabet; 4. Numeric data range; 5. Relative reliability; 6. Relative cost; and 7. Radio access technology. At 850, a selection of at least one shoulder-tap method is determined based upon the methodology of 845 for the present invention. At 860, the selected shoulder-tap method(s) are identified for delivery in accordance with the present invention where delivery may be for a single approach, multiple approaches, concurrent approaches, staged or phased approaches, etc.

In a preferred embodiment, a MS profile is determined to include a Radio access technology and an MS State of "in session" whereby through association using the present invention where a comparative assessment required a high relative reliability, 30,000 data characters and a medium relative cost, the present invention determined that a UDP shoulder-tap approach would be the optimal selection for the specific scenario.

In another preferred embodiment, a MS profile is determined to include a Radio access technology and an MS State of "in session" whereby through association using the present invention where a comparative assessment required a high relative reliability, a medium relative cost and no preferences for data character count, the present invention determined that any of a UDP, SIP and SNMP shoulder-tap approach could be an optimal selection for the specific scenario.

In a further preferred embodiment, a MS profile is determined to include a Radio access technology and an MS State of "in session" whereby through association using the present invention where a comparative assessment required a better than high relative reliability, a medium relative cost, no preferences for data character count, the present invention determined that each and all of a UDP, SIP and SNMP shoulder-tap approaches should concurrently be delivered to ensure a higher reliability of delivery for the specific scenario. For increased reliability, multiple shoulder-taps using different methods may be attempted, either simultaneously or serially, for instance, by the present invention.

In a further preferred embodiment, a MS profile is determined to include a Radio access technology and an MS State of "not in session" whereby through association using the present invention where a comparative assessment required a low relative reliability, a no greater than medium relative cost and no data character count, the present invention determined that a Phone Call shoulder-tap approach is selected for delivery for the specific scenario.

In a further preferred embodiment, a selection of an optimum shoulder-tap approach for delivery is determined based on the feasibility of the approach where the feasibility is defined to be adequately satisfied where the conditions of IP State, number of data characters, data alphabet, and numerical data range values are each met.

Under the present invention, in one or more embodiments, an optimal shoulder-tap method can be selected by the present invention and utilized by a user or third party system as an approach that provides for optimal reliability and economical benefit with respect to feasibility constraints for the specific scenario.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Many other embodiments of the present invention are also envisioned. For example, in other embodiments, the present invention is directly applicable for kits and improvement configurations to existing USB devices.

As used herein, terms such as personal computers, PCs, systems, servers, stations, and similar terms are intended to be used interchangeably, without distinction or limitation. Such systems may include but not be limited to servers, server-based systems, multi-chipset systems, touch sensitive systems, assemblies and devices therein, etc.

As used herein, the terms "remote", "peripheral", "device", and the like are intended to be used interchangeably but are not intended to be singular or necessarily specific to a particular connection technology such as being hardwired or wireless, but rather such terms are used with the understanding that the terms of interest are in or capable of being in operative communication with a system of the present invention.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:

1. A method for selecting a shoulder-tap approach for delivery to a cellular mobile station comprising:
   determining a cellular mobile station profile having cellular mobile station characteristics of at least one of a cellular mobile station state and a radio access technology;
   determining one or more shoulder-tap characteristics of a plurality of shoulder-tap approaches wherein the shoulder-tap characteristics of each of plurality of shoulder-tap approach includes at least one of: IP State, number of characters of data, data alphabet value, numeric data range value, relative reliability value and relative cost value;
   comparing the cellular mobile station characteristics of the cellular mobile profile and the one or more shoulder-tap characteristics; and
   selecting at least one of the shoulder-tap approaches in relation to a result of the comparing.

2. The method of claim 1, wherein selecting further includes ordering selected shoulder-tap approaches in a prioritized order in relation to a predetermined preference profile having a hierarchy of ordered preferences.

3. The method of claim 1, wherein the cellular mobile station profile includes cellular mobile station characteristics of at least the cellular mobile station state and the radio access technology.

4. The method of claim 1, wherein selecting further includes selecting plurality of the shoulder-tap approaches.

5. The method of claim 1, further including delivering at least one of the selected shoulder-tap approaches to the cellular mobile station.

6. The method of claim 5, wherein delivering further includes delivering a plurality of the selected shoulder-tap approaches to the cellular mobile station.

7. The method of claim 6, wherein delivering further includes delivering the plurality of the selected shoulder-tap approaches to the cellular mobile station concurrently.

8. The method of claim 6, wherein delivering further includes delivering the plurality of the selected shoulder-tap approaches to the cellular mobile station serially over time.

9. The method of claim 6, wherein delivering further includes delivering the plurality of the selected shoulder-tap approaches to the cellular mobile station separately in accordance with a priority in relation to the Relative Reliability of a selected shoulder-tap approach.

10. A method for delivering a prioritized shoulder-tap approach to a cellular mobile station comprising:
    determining a cellular mobile station profile having cellular mobile station characteristics of a cellular mobile station state and a radio access technology;
    determining two or more shoulder-tap characteristics of a two or more shoulder-tap approaches wherein the shoulder-tap characteristics of each of the two or more of shoulder-tap approach includes at least one of: IP State, number of characters of data, data alphabet value, numeric data range value, relative reliability value and relative cost value;
    comparing the cellular mobile station characteristics of the cellular mobile profile and the two or more shoulder-tap characteristics; and
    delivering at least one of the compared shoulder-tap approaches to the cellular mobile station.

11. The method of claim 10, wherein comparing further includes ordering the compared shoulder-tap approaches in a prioritized order in relation to a predetermined preference profile having a hierarchy of ordered preferences.

12. The method of claim 11, wherein the predetermined preference profile hierarchically ranks Relative Reliability of greatest importance.

13. The method of claim 11, wherein delivering further includes delivering a plurality of the selected shoulder-tap approaches to the cellular mobile station.

14. The method of claim 11, wherein delivering further includes delivering the plurality of shoulder-tap approaches to the cellular mobile station concurrently.

15. The method of claim 11, wherein delivering further includes delivering the plurality of shoulder-tap approaches to the cellular mobile station serially over time.

16. The method of claim 11, wherein delivering further includes delivering the plurality of shoulder-tap approaches to the cellular mobile station separately in accordance with a priority in relation to the Relative Reliability.

17. A method for selecting and delivering one or more shoulder-tap approaches for delivery to a mobile cellular station in a prioritized manner comprising the steps of: determining a cellular mobile station profile having cellular mobile station characteristics;
    determining shoulder-tap characteristics of at least two shoulder-tap approaches;
    comparing the at least two cellular mobile station characteristics of the cellular mobile profile and the shoulder-tap characteristics of each of the at least two shoulder-tap approaches in relation to a predetermined preference profile having a hierarchy of prioritized preferences;
    selecting shoulder-tap approaches in relation to the step of comparing for feasibility; and
    delivering in relation to the prioritized preferences at least one of the selected shoulder-tap approaches to the cellular mobile station.

18. The method of claim 17, wherein the predetermined preference profile hierarchically orders Relative Cost of greatest importance.

19. The method of claim 18, wherein delivering further includes delivering a plurality of the selected shoulder-tap approaches to the cellular mobile station.

20. A computer program product stored on a non-transitory computer usable medium, comprising:
    computer readable program means for causing a computer to control an execution of an application to perform a method for delivering a prioritized shoulder-tap approach to a cellular mobile station comprising the steps of:
      determining a cellular mobile station profile having cellular mobile station characteristics of a cellular mobile station state and a radio access technology;
      determining two or more shoulder-tap characteristics of a two or more shoulder-tap approaches wherein the shoulder-tap characteristics of each of the two or more of shoulder-tap approach includes at least one of: IP State, number of characters of data, data alphabet value, numeric data range value, relative reliability value and relative cost value;

comparing the cellular mobile station characteristics of the cellular mobile profile and the two or more shoulder-tap characteristics; and delivering at least one of the compared shoulder-tap approaches to the cellular mobile station.

* * * * *